US010994588B2

(12) United States Patent
Shelley et al.

(10) Patent No.: US 10,994,588 B2
(45) Date of Patent: May 4, 2021

(54) QUIET AIR EXTRACTOR FLAP FOR VEHICLE

(71) Applicant: WEGU Manufacturing Inc., Whitby (CA)

(72) Inventors: John Shelley, Whitby (CA); Rama Balaji, Whitby (CA)

(73) Assignee: WEGU MANUFACTURING INC., Whitby (CA)

( * ) Notice: Subject to any disclaimer, the term of this patent is extended or adjusted under 35 U.S.C. 154(b) by 213 days.

(21) Appl. No.: 16/216,289

(22) Filed: Dec. 11, 2018

(65) Prior Publication Data

US 2020/0180403 A1   Jun. 11, 2020

(51) Int. Cl.
*B60H 1/24* (2006.01)
*F24F 13/14* (2006.01)
*F24F 13/15* (2006.01)

(52) U.S. Cl.
CPC .......... *B60H 1/249* (2013.01); *F24F 13/1406* (2013.01); *F24F 13/15* (2013.01)

(58) Field of Classification Search
CPC .... B60H 1/249; B60H 1/248; Y10T 137/7891
USPC ................... 454/70, 162; 137/855
See application file for complete search history.

(56) References Cited

U.S. PATENT DOCUMENTS

| | | | |
|---|---|---|---|
| 4,580,488 A * | 4/1986 | Rose | F23J 13/08 454/5 |
| 5,167,574 A | 12/1992 | Ikeda et al. | |
| 2010/0243083 A1 * | 9/2010 | Shereyk | B60H 1/249 137/527 |
| 2018/0215236 A1 * | 8/2018 | Carlson | F16K 15/035 |
| 2018/0345755 A1 * | 12/2018 | Nolta | B60H 1/00678 |

OTHER PUBLICATIONS

Office Action in Canadian Patent Application No. 3,027,064 dated Apr. 6, 2020.

* cited by examiner

*Primary Examiner* — Vivek K Shirsat
*Assistant Examiner* — Ko-Wei Lin
(74) *Attorney, Agent, or Firm* — Ware, Fressola, Maguire & Barber LLP

(57) ABSTRACT

An air extractor for a vehicle, the air extractor comprising a frame having a top portion, a bottom portion, a left side portion and a right side portion surrounding a central air passage, the frame having an inlet side for receiving air from a passenger compartment of the vehicle and having an outlet side for exhausting the air from the passenger compartment of the vehicle, a gasket to seal the frame to the vehicle, a plurality of spoilers supported by the frame and disposed within the central air passage and a plurality of flaps pivotally mounted on the outlet side to pivot between a closed position that inhibits airflow and an open position that permits airflow, wherein each of the flaps comprises a plurality of bumpers to attenuate slap noise of the flaps and wherein each of the flaps further comprises a skirt to minimize air leakage.

18 Claims, 5 Drawing Sheets

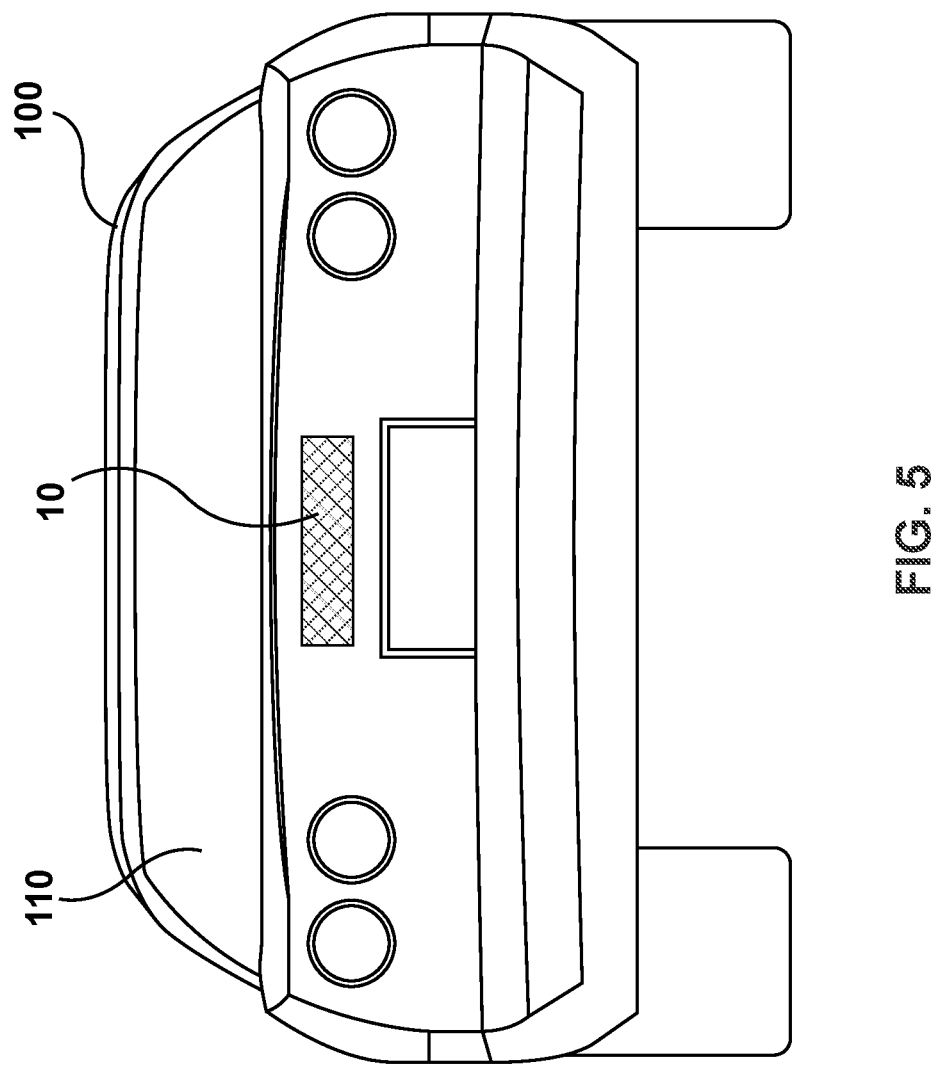

QUIET AIR EXTRACTOR FLAP FOR VEHICLE

TECHNICAL FIELD

The present disclosure relates generally to air extractors for vehicles and, more particularly, to air extractor flaps.

BACKGROUND OF THE INVENTION

An interior passenger compartment of an automobile is designed to provide a quiet environment and to protect the driver and passengers from outside elements, such as rain, snow, cold, heat, dust, exhaust fumes, pollution, etc. As such, automobiles typically provide an interior passenger compartment that is substantially sealed from the surrounding exterior environment. However, the air pressure inside the interior passenger compartment may undesirably exceed atmospheric pressure in some instances, for example, when a vehicle door is closed. If the interior is not vented to the atmosphere, the effort required to close the door may greatly increase, inconveniencing the driver or passenger of the vehicle. Deployment of air bags may also cause a sudden increase in internal pressure. Higher internal pressures can also be created by a fan of a climate control system or by the inrush of outside air when a window or sunroof is opened when traveling at high speeds.

Air extractors, also known as pressure relief valves, for equalizing the pressure between the interior compartment of an automobile and the atmosphere are known. The air extractor or pressure relief valve is placed between the interior space and the outside of the vehicle in order to control an exhaust flow of air from the interior. The air extractor is typically connected by a duct to the passenger compartment. The air extractor permits air to be expelled or discharged from the vehicle passenger compartment, while preventing air, gas, fumes, and/or other undesirable substances from entering into the passenger compartment. By minimizing overpressure in the passenger compartment, the air extractor improves the performance of the climate control system, makes it easier to close doors, and reduces the unpleasant buffeting noise from open windows. Further performance improvements, particularly relating to flap noise, would be highly desirable. Accordingly, a quieter air extractor with reduced flap noise would be highly desirable.

BRIEF SUMMARY OF THE INVENTION

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a quiet air extractor. The air extractor uses bumpers to reduce the slap noise of the flap and it uses a skirt to minimize air leakage that would otherwise occur due to the bumpers.

One inventive aspect of the disclosure is an air extractor comprising an air extractor for a vehicle, the air extractor comprising a frame having a top portion, a bottom portion, a left side portion and a right side portion surrounding a central air passage, the frame having an inlet side for receiving air from a passenger compartment of the vehicle and having an outlet side for exhausting the air from the passenger compartment of the vehicle, a gasket to seal the frame to the vehicle, a plurality of spoilers supported by the frame and disposed within the central air passage and a plurality of flaps pivotally mounted on the outlet side to pivot between a closed position that inhibits airflow and an open position that permits airflow, wherein each of the flaps comprises a plurality of bumpers to attenuate slap noise of the flaps and wherein each of the flaps further comprises a skirt to minimize air leakage.

Another inventive aspect of the disclosure is a vehicle comprising a passenger compartment defining an interior space and an air extractor including a frame having a top portion, a bottom portion, a left side portion and a right side portion surrounding a central air passage, the frame having an inlet side for receiving air from a passenger compartment of the vehicle and having an outlet side for exhausting the air from the passenger compartment of the vehicle, a gasket to seal the frame to the vehicle, a plurality of spoilers supported by the frame and disposed within the central air passage and a plurality of flaps pivotally mounted on the outlet side to pivot between a closed position that inhibits airflow and an open position that permits airflow, wherein each of the flaps comprises a plurality of bumpers to attenuate slap noise of the flaps and wherein each of the flaps further comprises a skirt to minimize air leakage.

BRIEF DESCRIPTION OF THE DRAWINGS

These and other features of the disclosure will become more apparent from the description in which reference is made to the following appended drawings.

FIG. 5 is another depiction of an automobile showing another example location of the air extractor.

DETAILED DESCRIPTION OF THE INVENTION

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Described herein is an air extractor or pressure relief valve for a vehicle such as, for example, an automobile. The air extractor has a flap having bumpers and skirts to reduce slap noise when the flap opens or closes. The slap noise occurs typically under wind throb conditions when the flap contacts the frame or the ribs or other structural elements of the frame. For the purposes of this specification, the term "vehicle" shall be construed broadly to encompass various automotive vehicles including, for greater certainty, automobiles, cars, trucks, buses, vans, minivans, sports utility vehicles (SUV's) or any other vehicle that has an enclosed passenger compartment for which an overpressure condition may be relieved using an air extractor (pressure relief valve).

Figure 1:
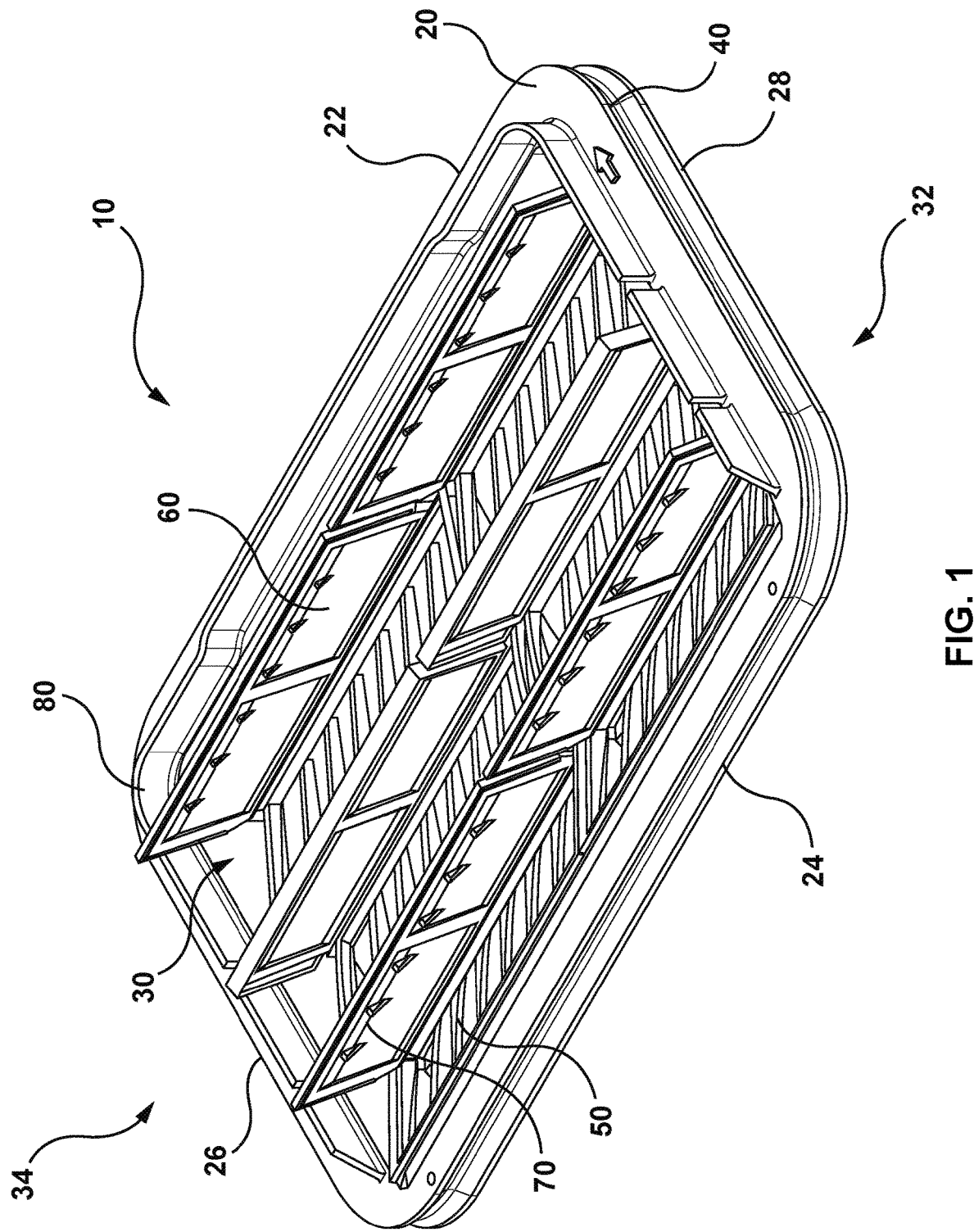
FIG. 1 is an isometric view of an air extractor with quiet flaps in accordance with an embodiment of the present invention.

In the embodiment depicted in FIG. 1, an air extractor 10 for a vehicle has a frame 20 having a top portion 22, a bottom portion 24, a left side portion 26 and a right side portion 28 surrounding a central air passage 30. The frame may also be referred to as a substrate. The frame shown in FIG. 1 is substantially rectangular with rounded corners although in other embodiments the frame may have other suitable shapes. The frame 20 has an inlet side 32 for receiving air from a passenger compartment of the vehicle and having an outlet side 34 for exhausting the air from the passenger compartment of the vehicle. The air extractor 10 has a gasket 40 to seal the frame to the vehicle, and a plurality of spoilers 50 supported by the frame and disposed within the central air passage. The air extractor 10 includes a plurality of flaps 60 pivotally mounted on the outlet side to pivot between a closed position that inhibits airflow and an open position that permits airflow. Each of the flaps 60 comprises a plurality of bumpers 70 to attenuate slap noise of the flaps. Each of the flaps 60 further comprises a skirt 80 to minimize air leakage.

In the air extractor depicted in FIG. 1, each flap 60 is substantially rectangular defining a first long side 62, a second long side 64, a first short side 66 and a second short side 68. In other embodiments, the flap may have a different shape. Each flap 60 has a pair of pivot arms 68 protruding from the first long side. The pivot arms are designed to be rotationally mounted within sockets or bores to enable the flap to pivot or rotate. The rotation of the flap opens and closes the flap to permit air to flow or to block the flow of air. The bumpers 70 are disposed along the second long side 64 in this illustrated embodiment. In the illustrated embodiment shown in FIG. 1, the bumpers 70 are wedge-like structures or ramp-like components that taper inwardly from the second long side toward the first long side.

In the illustrated embodiment shown by way of example in FIG. 1, the skirt 80 extends along the second long side and also along the first and second short sides. The skirt 80 in this embodiment is a continuous lip or ridge to provide an airtight seal when the flaps are closed.

In the embodiment illustrated in FIG. 1, the air extractor 10 comprises six openings covered by six flaps 60, e.g. three pairs of flaps. The six openings may include six ribs each in one embodiment. In other embodiments there may be a different number of openings and flaps. In this illustrated embodiment, the openings are not equal in size and shape. In another embodiment, the air extractor 10 may have any suitably sized openings and/or shaped openings that differ from what is illustrated.

In the illustrated embodiment, the frame 20 is made of polypropylene, e.g. 40% talc-filled polypropylene although it will be appreciated that a comparable material may be used in other embodiments. In the illustrated embodiment, the flaps 60 are made of thermoplastic elastomer although another suitable material may be used in other embodiments. In some embodiments, the gasket 40 is made of thermoplastic elastomer although another suitable material may be used in other embodiments.

Figure 2:
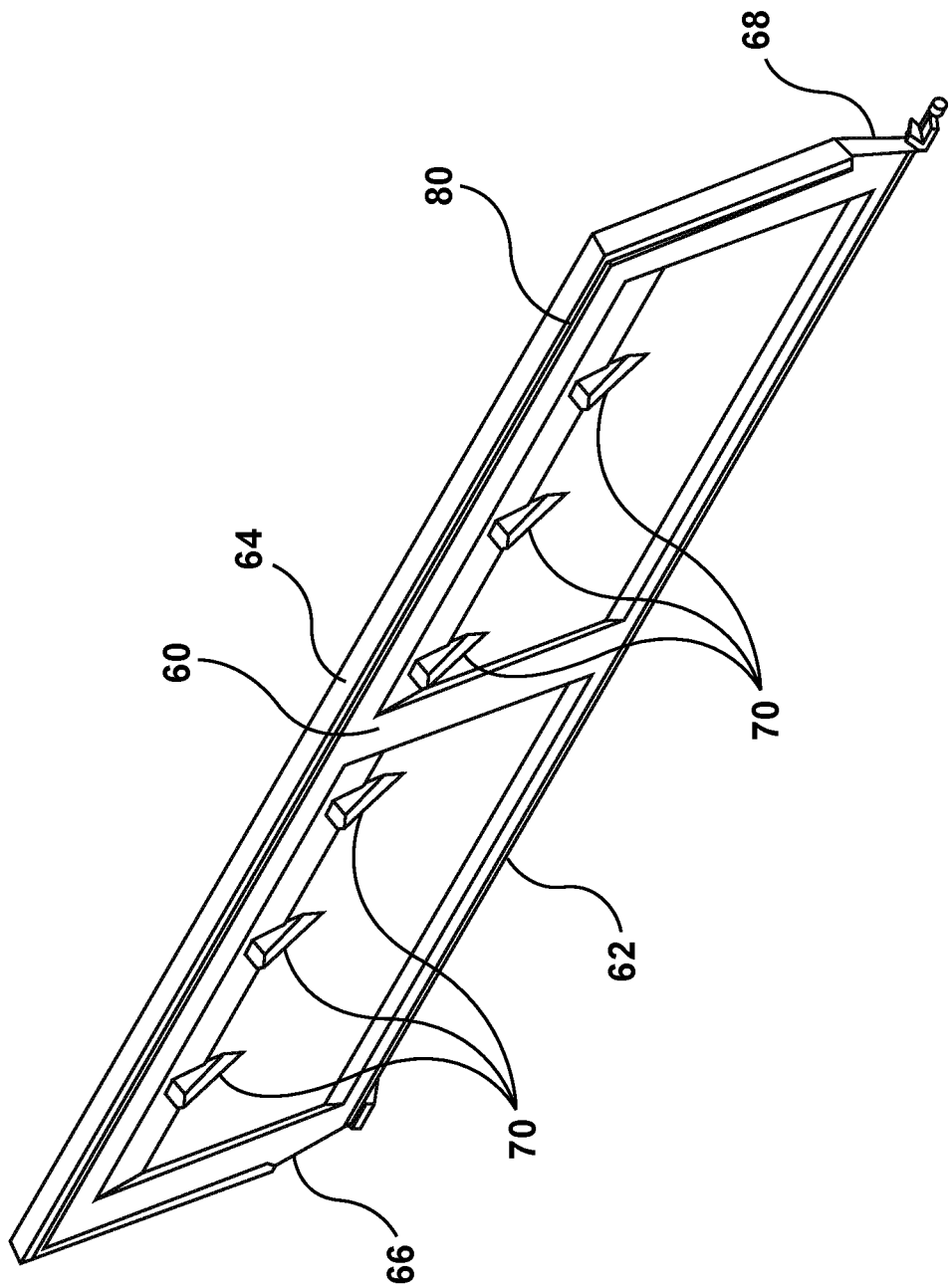
FIG. 2 is an isometric view of the quiet flap used in the air extractor of FIG. 1.

The flap 60 shown by way of example in FIG. 2 includes twelve bumpers 70 per flap 60 although the number of bumpers 70 per flap 60 may be varied in other embodiments. The bumpers 70 are disposed on both sides of each flap 60. The twelve bumpers 70 are disposed on each flap 60 such that there are six bumpers 70 on each side of each flap 60 in the illustrated embodiment. In other embodiments, there may be a different number, layout or configuration of bumpers. The bumpers are identically sized and shaped to ensure that all of the bumpers make contact simultaneously although in other embodiments the size and shape of the bumpers may be varied while still providing simultaneous contact. In the illustrated embodiment, the bumpers are made of the same material as the flaps. However, in another embodiment, the bumpers may be made of a different material, e.g. a softer or more easily compressible material.

Figure 3:
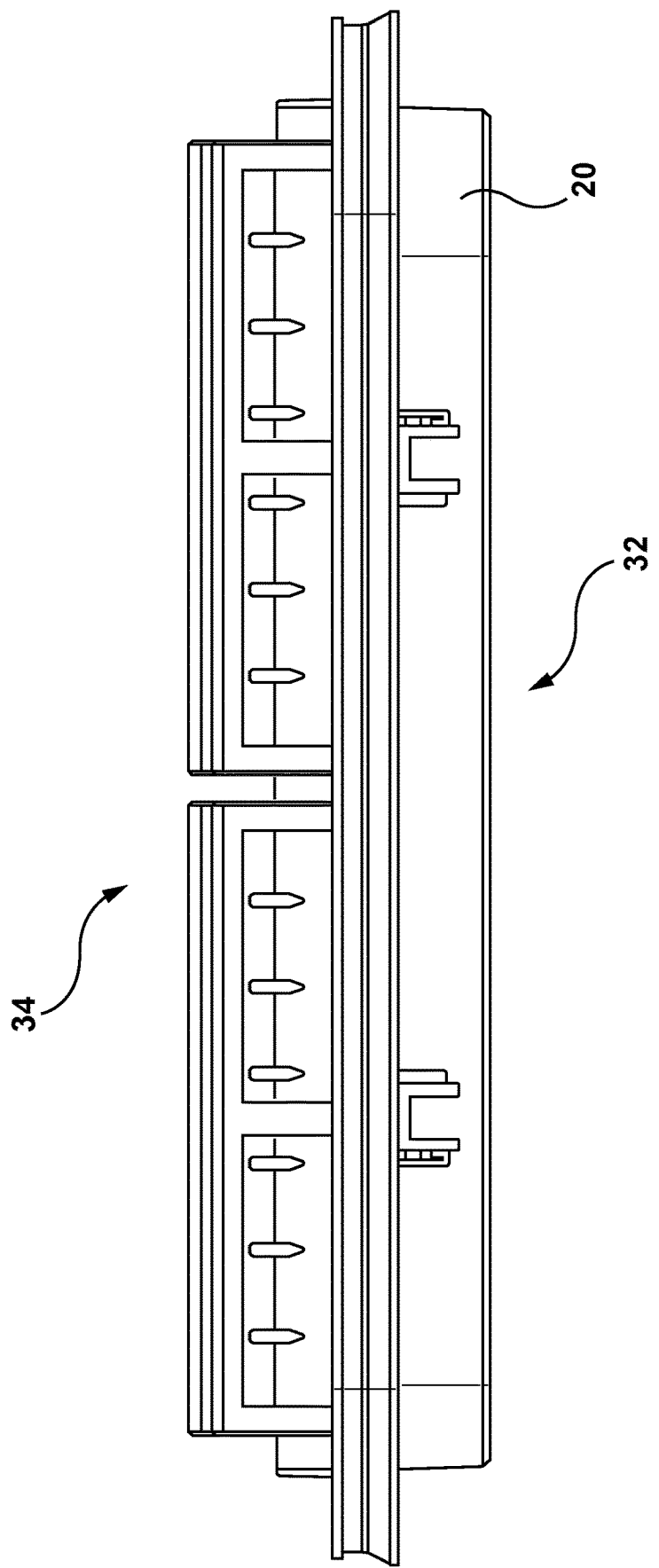
FIG. 3 is a side view of the air extractor of FIG. 1.

FIG. 3 is a side view of the air extractor of FIG. 1. FIG. 3 shows the frame 20 and the inlet side 32 for receiving air from a passenger compartment of the vehicle and the outlet side 34 for exhausting the air from the passenger compartment of the vehicle.

Figure 4:
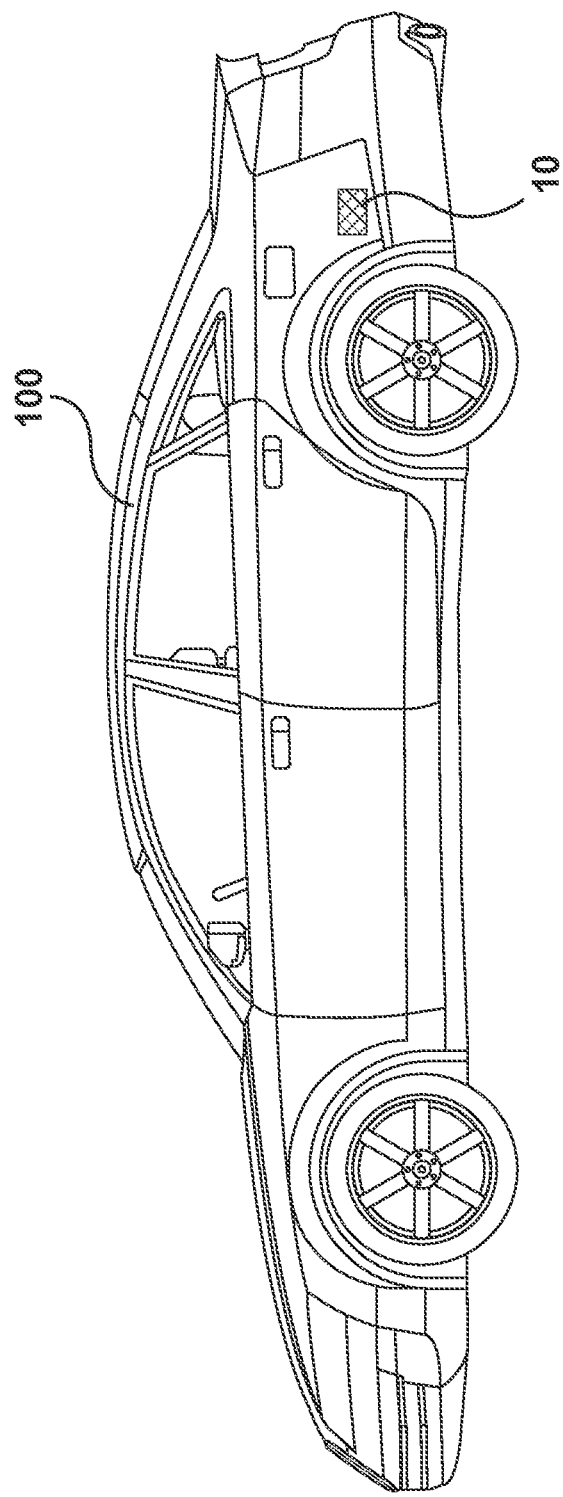
FIG. 4 is a depiction of an automobile as one example of a vehicle having the air extractor of FIG. 1.

FIGS. 4 and 5 depict a vehicle 100, e.g. an automobile, comprising a passenger compartment 110 defining an interior space and an air extractor 10 as described above. FIGS. 4 and 5 show two different example locations of the air extractor. In the vehicle there may be a single air extractor or multiple air extractors. The air extractor may be disposed at the rear of the passenger compartment although other locations may be possible in other embodiments. The air extractor 10 may be disposed near or adjacent the tail lights. As described above, the air extractor 10 includes a frame having a top portion, a bottom portion, a left side portion and a right side portion surrounding a central air passage, the frame having an inlet side for receiving air from a passenger compartment of the vehicle and having an outlet side for exhausting the air from the passenger compartment of the vehicle, a gasket to seal the frame to the vehicle, a plurality of spoilers supported by the frame and disposed within the central air passage and a plurality of flaps pivotally mounted on the outlet side to pivot between a closed position that inhibits airflow and an open position that permits airflow. As described above, each of the flaps comprises a plurality of bumpers to attenuate slap noise of the flaps and wherein each of the flaps further comprises a skirt to minimize air leakage.

In the air extractor of the vehicle depicted by way of example in the figures, each flap (as described above) is substantially rectangular with rounded corners defining a first long side, a second long side, a first short side and a second short side, and wherein each flap has a pair of pivot arms extending from the first long side and wherein the bumpers are disposed along the second long side. In the air extractor of the vehicle, the skirt extends along the second long side and also along the first and second short sides as described above. The bumpers are wedge-like structures that taper inwardly from the second long side toward the first long side. There are six openings covered by three pairs of flaps. In at least some embodiments, the frame is made of polypropylene and the flaps are made of thermoplastic elastomer. As described above, in at least some embodiments, the air extractor comprises twelve bumpers per flap such that bumpers are disposed on both sides of each flap. These bumpers are spaced so that they land on the ribs when the flaps close.

The flaps of the air extractor may be passive flaps or active flaps. Passive flaps are pushed open by the air pressure acting on the flaps. Active flaps are opened mechanically by one or more actuators that are driven by a controller that receives a signal indicative of an overpressure condition or an imminent overpressure condition, e.g. detecting that a window or sunroof is being opened.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

What is claimed:

1. An air extractor for a vehicle, the air extractor comprising:
    a frame having a top portion, a bottom portion, a left side portion and a right side portion surrounding a central air passage, the frame having an inlet side for receiving air from a passenger compartment of the vehicle and having an outlet side for exhausting the air from the passenger compartment of the vehicle;
    a gasket to seal the frame to the vehicle;
    a plurality of spoilers supported by the frame and disposed within the central air passage; and
    a plurality of flaps pivotally mounted on the outlet side to pivot between a closed position that inhibits airflow and an open position that permits airflow, wherein each of the flaps comprises a plurality of bumpers to attenuate slap noise of the flaps and wherein each of the flaps further comprises a skirt to minimize air leakage,
    wherein each flap is substantially rectangular defining a first long side, a second long side, a first short side and a second short side, and wherein each flap has a pair of pivot arms extending from the first long side and wherein the bumpers are disposed along the second long side.

2. The air extractor of claim 1 wherein the skirt extends along the second long side and also along the first and second short sides.

3. The air extractor of claim 1 wherein the bumpers are wedge-like structures that taper inwardly from the second long side toward the first long side.

4. The air extractor of claim 1 comprising six openings covered by three pairs of flaps.

5. The air extractor of claim 1 wherein the frame is made of polypropylene.

6. The air extractor of claim 1 wherein the flaps are made of thermoplastic elastomer.

7. The air extractor of claim 1 comprising twelve bumpers per flap.

8. The air extractor of claim 1 wherein the bumpers are disposed on both sides of each flap.

9. The air extractor of claim 3 wherein twelve bumpers are disposed on each flap such that there are six bumpers on each side of each flap.

10. A vehicle comprising:
    a passenger compartment defining an interior space;
    an air extractor including:
    a frame having a top portion, a bottom portion, a left side portion and a right side portion surrounding a central air passage, the frame having an inlet side for receiving air from a passenger compartment of the vehicle and having an outlet side for exhausting the air from the passenger compartment of the vehicle;
    a gasket to seal the frame to the vehicle;
    a plurality of spoilers supported by the frame and disposed within the central air passage; and
    a plurality of flaps pivotally mounted on the outlet side to pivot between a closed position that inhibits airflow and an open position that permits airflow, wherein each of the flaps comprises a plurality of bumpers to attenuate slap noise of the flaps and wherein each of the flaps further comprises a skirt to minimize air leakage,
    wherein each flap is substantially rectangular defining a first long side, a second long side, a first short side and a second short side, and wherein each flap has a pair of pivot arms extending from the first long side and wherein the bumpers are disposed along the second long side.

11. The air extractor of claim 10 wherein the skirt extends along the second long side and also along the first and second short sides.

12. The air extractor of claim 10 wherein the bumpers are wedge-like structures that taper inwardly from the second long side toward the first long side.

13. The air extractor of claim 10 comprising six openings covered by three pairs of flaps.

14. The air extractor of claim 10 wherein the frame is made of polypropylene.

15. The air extractor of claim 10 wherein the flaps are made of thermoplastic elastomer.

16. The air extractor of claim 10 comprising twelve bumpers per flap.

17. The air extractor of claim 10 wherein the bumpers are disposed on both sides of each flap.

18. The air extractor of claim 12 wherein twelve bumpers are disposed on each flap such that there are six bumpers on each side of each flap.

* * * * *